June 6, 1950     S. KANAGAWA     2,510,584
PLANT HOLE TROWEL
Filed April 29, 1947     2 Sheets-Sheet 2
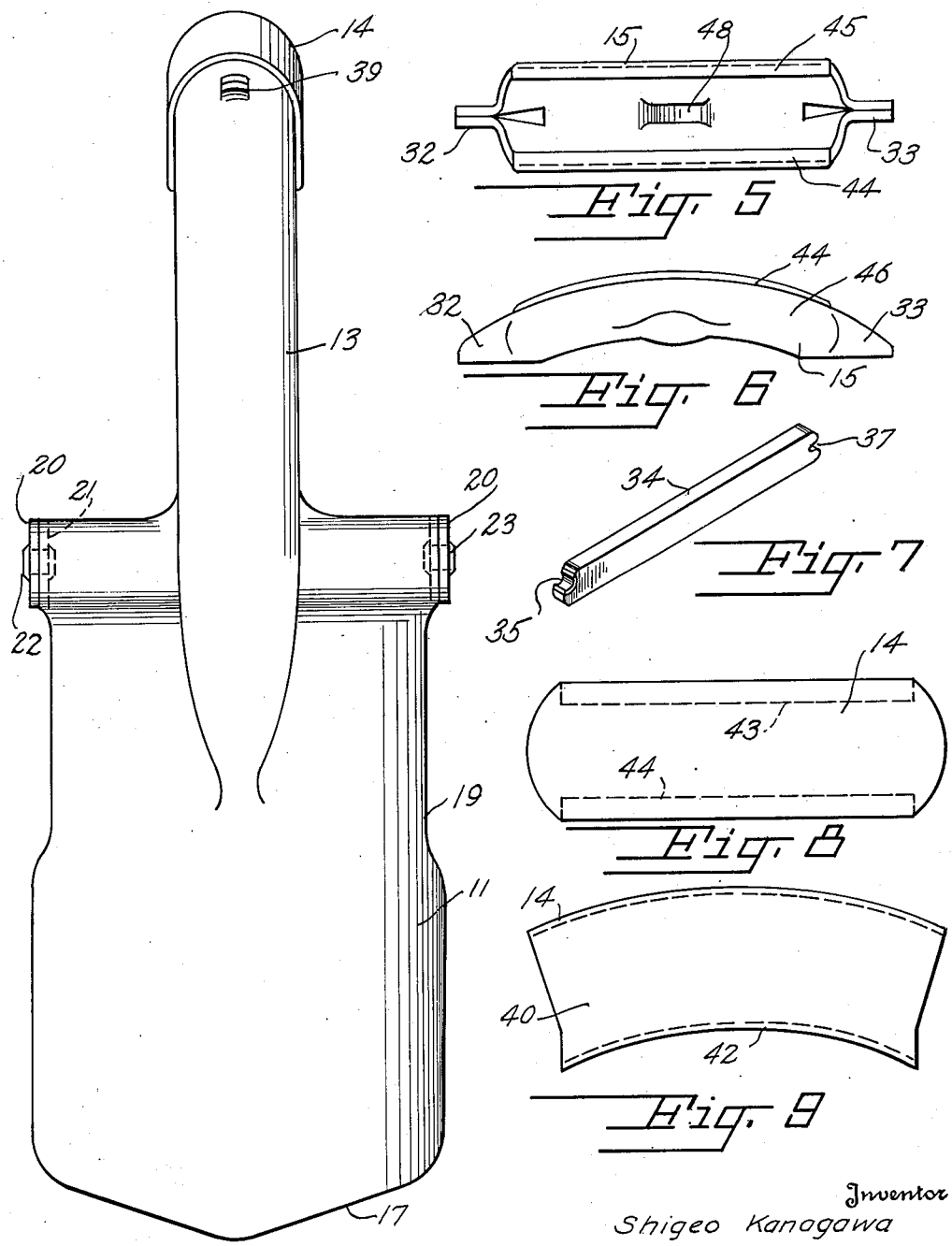
Inventor
Shigeo Kanagawa
By McMorrow, Berman + Davidson
Attorneys Patented June 6, 1950

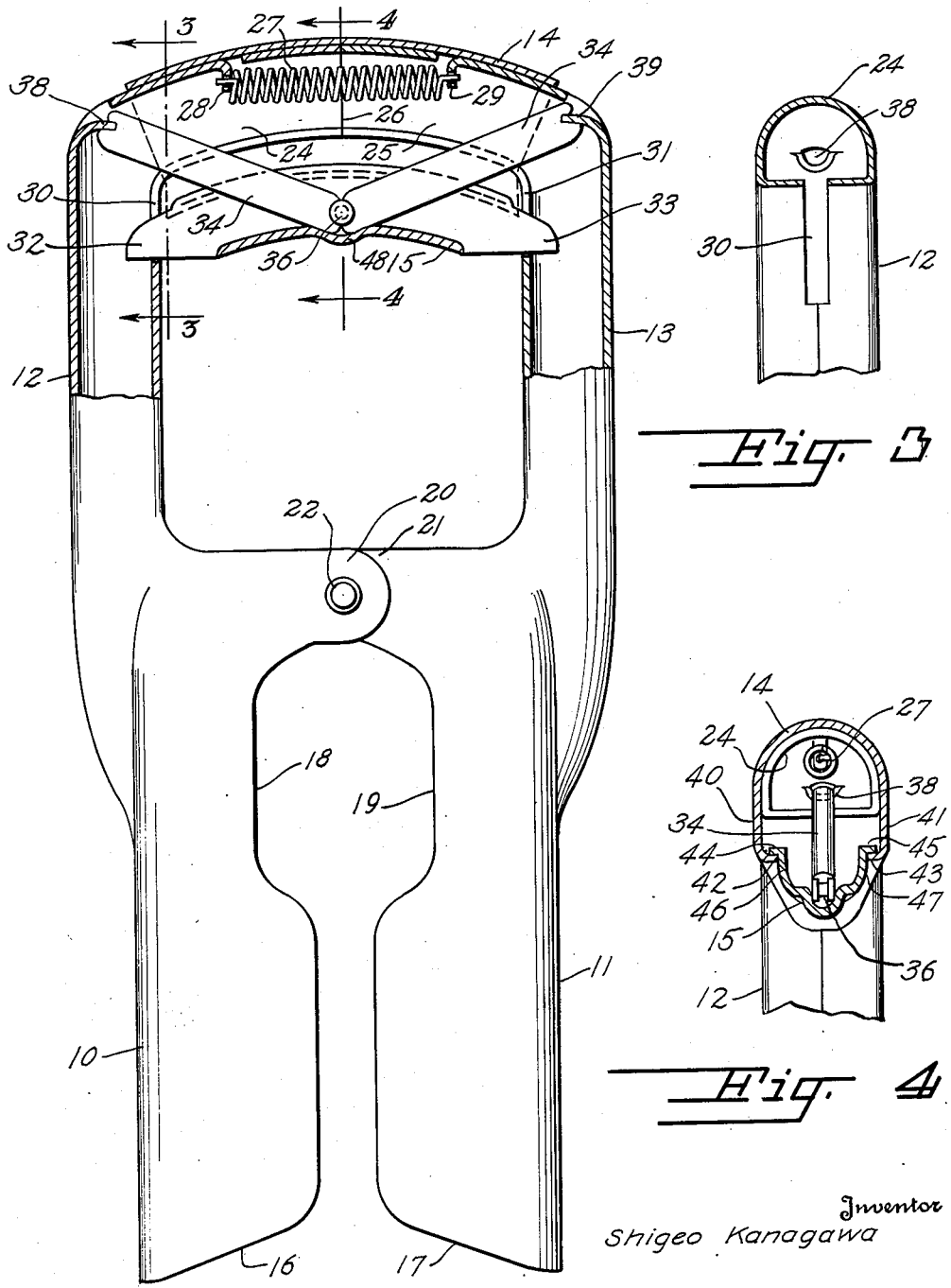

2,510,584

UNITED STATES PATENT OFFICE 2,510,584

PLANT HOLE TROWEL

Shigeo Kanagawa, San Marino, Calif.

Application April 29, 1947, Serial No. 744,636

3 Claims. (Cl. 294—50.8)

This invention relates to garden tools of the type used by hand, particularly for forming small holes or openings in the ground, or setting out small plants, and in particular, the invention includes a device having two hinged oppositely positioned depending arcuate trowel elements connected at their upper ends by a handle with gripping means incorporated therein by which the trowel elements are actuated to gripping relation with soil therebetween.

The purpose of this invention is to provide a small hand-actuated tool for readily forming open holes in the ground so that plants may be set therein.

In all gardening, and particularly truck farming, plants are started usually in hothouses, cold frames and the like, and when the weather permits, or other crops are out of the ground, the small plants are set out. Various devices have been provided for forming holes for the plants, but almost without exception, the soil falls back into the hole. With this thought in mind, this invention contemplates a small garden tool having a pair of substantially semi-circular complementary oppositely positioned trowel elements and a handle by which the elements may be forced into the ground and through which the elements may be forced together with a scissors action for clamping the soil therebetween so that it may readily be removed to leave a clean opening.

The object of this invention is to provide means for hingedly mounting two oppositely positioned trowel elements wherein the elements may be forced into the ground and into gripping relation with the ground between the elements with a unitary action.

Another object of the invention is to provide a plant hole trowel that may be operated by one hand while a plant is set in a preceding opening formed by the trowel with the other hand.

A further object of the invention is to provide a garden tool for readily evacuating small holes for plants which is of a simple and economical construction.

With these and other objects in view, the invention embodies a garden tool having a pair of substantially semi-circular complementary oppositely positioned trowel elements with substantially parallel upwardly extending arms with inwardly extending upper ends, wherein the elements are pivotally connected mid-way of the length thereof, and a handle with toggle elements therein mounted on and in sliding engagement with the inwardly extending ends of the arms, wherein as the handle is squeezed, the trowel elements are forced together to grip soil therebetween.

Other features and advantages of the invention will appear from the following description taken in connection with the drawings, wherein:

Figure 1 is a view showing a side elevation of the trowel with parts of the upper ends broken away and shown in section illustrating the relative positions of the operating instrumentalities associated with the handle.

Figure 2 is a view showing an end elevation of the trowel.

Figure 3 is a detail showing a section through the upper end of one of the arms of the trowel with the parts associated with the handle omitted, taken on line 3—3 of Figure 1.

Figure 4 is a cross-section through the handle of the trowel taken on line 4—4 of Figure 1.

Figure 5 is a plan view of the saddle element forming the lower part of the handle and to which the toggle elements are connected.

Figure 6 is a view showing a side elevation of the saddle element illustrated in Figure 5.

Figure 7 is a detail showing one of the toggle links mounted in association with the saddle element and handle.

Figure 8 is a plan view of the handle.

Figure 9 is a view showing a side elevation of the handle with the other parts omitted.

Referring now to the drawings, wherein like reference characters indicate corresponding parts, the double-blade trowel of this invention includes complementary blade elements 10 and 11, upwardly extending arms 12 and 13, a handle 14, and a saddle 15 which provides an actuating member.

The trowel elements 10 and 11 are substantially semi-circular in cross-section, with the lower cutting edges thereof slightly inclined, as shown at the points 16 and 17, and with the upper inner edges thereof relieved to provide recesses 18 and 19. The upper inner edges of the elements 10 and 11 are provided with inwardly extending ears 20 on the element 10 and 21 on the element 11. The elements are pivotally connected to the ears by rivets 22 and 23.

The arms 12 and 13 are tubular shape in cross-section and the upper ends 24 and 25 thereof extend inward to the point 26 on the center line of the trowel. The upper ends are urged to the normal position illustrated in Figure 1 by a spring 27, one end of which is attached to a projection 28 in the upper end of the arm 12, and the other is attached to a projection 29 in the upper end of the arm 13. The inner surfaces of the upper ends of the arms are provided with slots 30 and 31 into which the ends 32 and 33 in the form of guide tongues of the saddle element 15 extend, and also through which the links 34 forming the toggle element extend. The inner ends of the links 34 are provided with sockets 35 through which they are pivotally held on a pin 36 extending through the saddle 15 and the opposite ends of the links are provided with notches 37 by which the outer ends of the links are held on projections 38 and 39 extending inward from the outer surfaces of the upper ends of the arms of the trowel elements. The links 34 in both sides of the handle are similar, so that the same reference numerals are used for both.

The handle 14 is shown in detail in Figures 8 and 9, and in cross section in Figure 4. This handle is formed with an arcuate upper surface with depending sides 40 and 41, and the lower edges of the sides are provided with inwardly extending flanges 42 and 43 upon which outwardly extending flanges 44 and 45 of the saddle element 15 are held, as shown in Figure 4.

The saddle element 15 is provided with an arcuate lower surface, as shown in cross-section in Figure 4, and the flanges 44 and 45 are formed on the upper edges of substantially flat sides 46 and 47 thereof. The inner ends of the toggle elements 34, which are mounted on the pin 36, extend into a centrally disposed recess 48, as shown, and the outer ends which are provided with notches 37 are held over projections 38 and 39 extending inward at the upper ends of the arms.

With the elements arranged in this manner, the tool may be held in one hand of the gardener, and, with plants in the other hand, the tool may be forced into the ground and the saddle element drawn upward with a comparatively simple movement and as the tool is withdrawn, the soil between the trowel elements 10 and 11 will be removed providing an open hole into which the plants may readily be set. In planting continuous rows of plants, the gardener may move rapidly along the row forming the holes with one hand and setting the plants with the other. The trowel may be made of any suitable material, and may be provided in different sizes for different uses.

It will be understood that modifications may be made in the design and arrangement of the parts without departing from the spirit of the invention.

What is claimed is:

1. A garden tool comprising a pair of oppositely disposed trowel members, a pair of oppositely disposed upwardly extending arms carried by said trowel members, pivot means connecting the said trowel members, an actuator member extending between said arms and in engagement with the latter, toggle means connecting said actuator member to said arms, a handle having depending sides straddling the upper ends of said arms and having the lower edges of said sides engageable with said actuator member, and spring means operatively connected to said arms for urging the latter to their normal position.

2. A garden tool comprising a pair of oppositely disposed trowel members, a pair of oppositely disposed upwardly extending arms having slots in the inner surfaces of the upper ends thereof carried by said trowel members, pivot means connecting the said trowel members, an actuator member having guide tongues on its ends arranged between said arms, the guide tongues of said actuator member extending into the slots of said arms, toggle means connecting said actuator member to said arms, a handle having depending sides straddling the upper ends of said arms and having the lower edges of said sides engageable with said actuator member, and spring means operatively connected to said arms for urging the latter to their normal position.

3. A garden tool comprising a pair of oppositely disposed trowel members, a pair of oppositely disposed upwardly extending arms carried by said trowel members, pivot means connecting the said trowel members, an actuator member extending between said arms and in engagement with the latter, toggle means pivotally mounted in said actuator member and connected to the upper ends of said arms, a handle having depending sides straddling the upper ends of said arms and having the lower edges of said sides engageable with said actuator member, and spring means operatively connected to said arms for urging the latter to their normal position.

SHIGEO KANAGAWA.

REFERENCES CITED

The following references are of record in the file of this patent:

UNITED STATES PATENTS

| Number | Name | Date |
| --- | --- | --- |
| 182,367 | Jones | Sept. 19, 1876 |
| 541,590 | Bulmer | June 25, 1895 |
| 554,714 | Murphy | Feb. 18, 1896 |
| 1,553,270 | Saffold | Sept. 8, 1925 |
| 1,859,603 | Rissi | May 24, 1932 |
| 2,435,473 | Sonnenberg | Feb. 3, 1948 |